(12) United States Patent
Yang et al.

(10) Patent No.: US 8,473,804 B2
(45) Date of Patent: Jun. 25, 2013

(54) ENHANCED WIRELESS COMMUNICATION WITH HARQ

(75) Inventors: Hong-Kui Yang, San Diego, CA (US); Shu Wang, San Diego, CA (US)

(73) Assignee: VIA Telecom, Inc., San Diego, CA (US)

( * ) Notice: Subject to any disclaimer, the term of this patent is extended or adjusted under 35 U.S.C. 154(b) by 172 days.

(21) Appl. No.: 13/088,868

(22) Filed: Apr. 18, 2011

(65) Prior Publication Data

US 2011/0264976 A1 Oct. 27, 2011

Related U.S. Application Data

(60) Provisional application No. 61/327,831, filed on Apr. 26, 2010, provisional application No. 61/332,989, filed on May 10, 2010.

(51) Int. Cl.
*H04L 1/18* (2006.01)

(52) U.S. Cl.
USPC .......................................................... 714/749

(58) Field of Classification Search
USPC .......................................................... 714/749
See application file for complete search history.

(56) References Cited

U.S. PATENT DOCUMENTS

| 8,271,843 B2 * | 9/2012 | Tseng ............................. 714/748 |
| 2003/0235160 A1 * | 12/2003 | Saifuddin ...................... 370/326 |
| 2005/0052991 A1 * | 3/2005 | Kadous .......................... 370/216 |
| 2008/0310540 A1 * | 12/2008 | Tiirola et al. .................. 375/267 |
| 2010/0158032 A1 * | 6/2010 | Carlsson ........................ 370/412 |
| 2011/0041027 A1 * | 2/2011 | Fong et al. ..................... 714/749 |

* cited by examiner

*Primary Examiner* — Albert Decady
*Assistant Examiner* — Enam Ahmed
(74) *Attorney, Agent, or Firm* — Richard K. Huffman; James W. Hufman

(57) ABSTRACT

A wireless communication system including a receiver and a transmitter. The receiver receives a frame of data, and sends an acknowledgement. The acknowledgement includes a positive acknowledgement (ACK) if the data is successfully decoded or a negative acknowledgement (NAK) if the data is unsuccessfully decoded. The acknowledgement is sent according to timing of an acknowledge mask. The transmitter is wirelessly coupled to the receiver, and receives the acknowledgement according to the acknowledge mask, and sends a response to the receiver according to the acknowledgement. The response includes, if an ACK is received before transmission completes of the frame, the transmitter terminates transmission of the frame; if a NAK is received before transmission completes of the frame, the transmitter continues to send the frame; and if an ACK is not received before a predefined frame early scheduling point, the transmitter retransmits the frame after transmission completes of the frame.

14 Claims, 9 Drawing Sheets

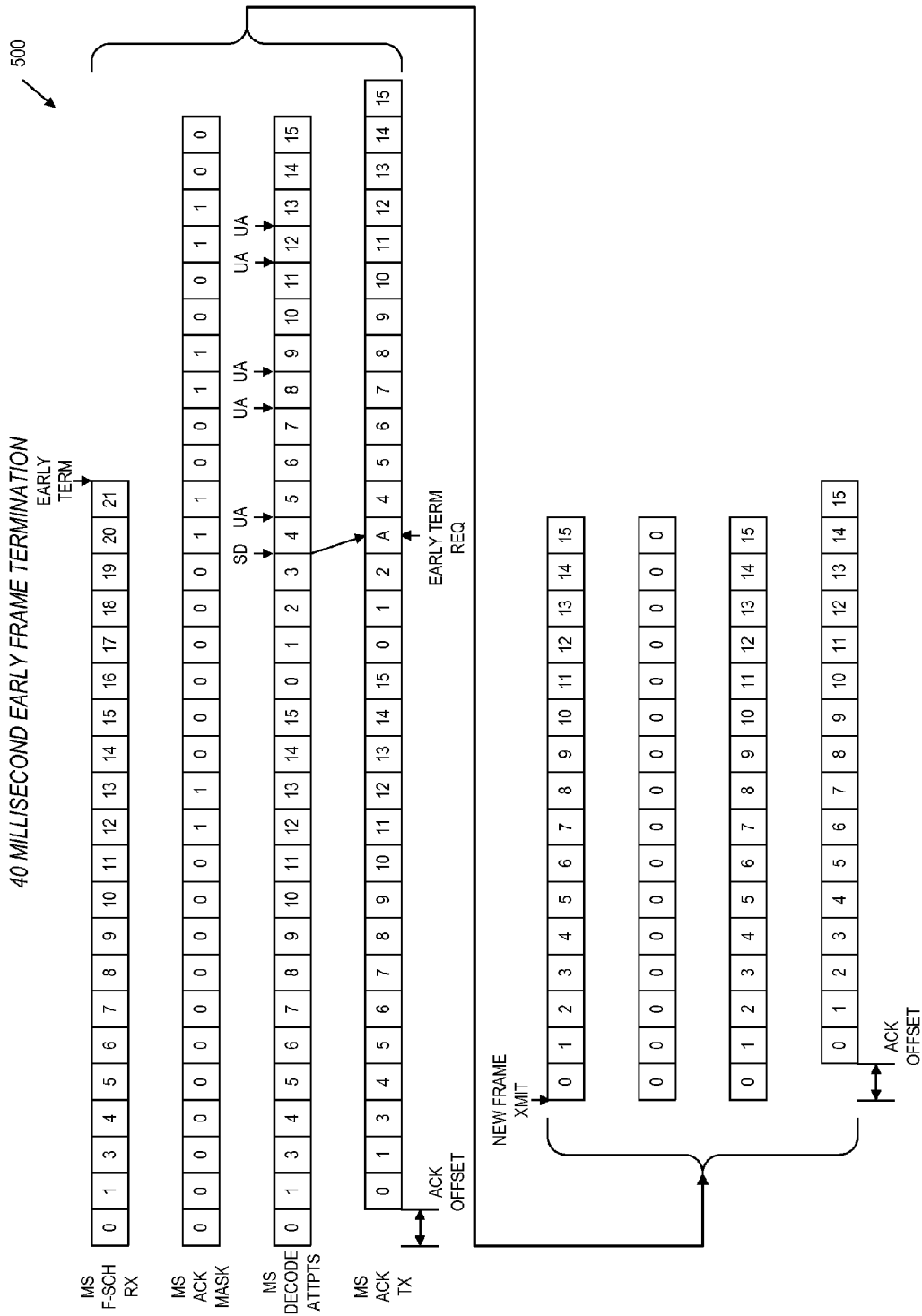

FIG. 6

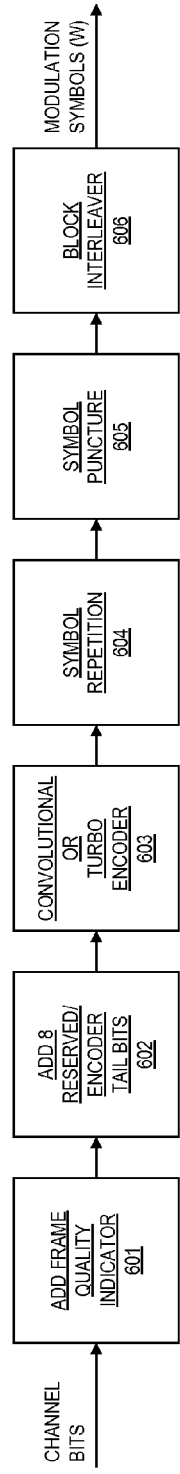

FORWARD LINK FUNDAMENTAL AND SUPPLEMENTAL FRAME STRUCTURE

CHANNEL BITS → ADD FRAME QUALITY INDICATOR 601 → ADD 8 RESERVED/ENCODER TAIL BITS 602 → CONVOLUTIONAL OR TURBO ENCODER 603 → SYMBOL REPETITION 604 → SYMBOL PUNCTURE 605 → BLOCK INTERLEAVER 606 → MODULATION SYMBOLS (W)

600

| BITS/FRAME | BITS | DATA RATE (KBPS) | R | FACTOR | DELETION | SYMBOLS | RATE (KBPS) |
|---|---|---|---|---|---|---|---|
| 16 BITS/20 MS | 12 | 1.8 | 1/2 | 8X | 4 OF 12 | 384 | 19.2 |
| 40 BITS/20N MS | 12 | 3.0/N | 1/2 | 4X | 1 OF 5 | 384 | 19.2/N |
| 80 BITS/20N MS | 12 | 5.0/N | 1/2 | 2X | 1 OF 25 | 384 | 19.2/N |
| 172 BITS/20N MS | 12 | 9.6/N | 1/2 | 1X | NONE | 384 | 19.2/N |
| 360 BITS/20N MS | 16 | 19.2/N | 1/2 | 1X | NONE | 768 | 38.4/N |
| 744 BITS/20N MS | 16 | 38.4/N | 1/2 | 1X | NONE | 1536 | 76.8/N |
| 1512 BITS/20N MS | 16 | 76.8/N | 1/2 | 1X | NONE | 3072 | 153.6/N |
| 3048 BITS/20N MS | 16 | 153.6/N | 1/2 | 1X | NONE | 6144 | 307.2/N |
| 6120 BITS/20N MS | 16 | 307.2/N | 1/2 | 1X | NONE | 12288 | 614.4/N |

NOTES:
1. THE FORWARD FUNDAMENTAL CHANNEL ONLY USES 0, 36, 60, 100, OR 192 ENCODER INPUTS PER FRAME.
2. THE FORWARD SUPPLEMENTAL CHANNEL ONLY USES 192, 384, 768, 1536, 3072, OR 6144 ENCODER INPUTS PER FRAME.
3. TURBO CODING IS USED FOR THE FORWARD SUPPLEMENTAL CHANNELS WITH 384 OR MORE ENCODER INPUT BITS PER FRAME, OTHERWISE, K = 9 CONVOLUTIONAL ENCODING IS USED.
4. WITH CONVOLUTIONAL ENCODING, THE RESERVED/ENCODER TAIL BITS PROVIDE AN ENCODER TAIL. WITH TURBO CODING, THE FIRST TWO OF THESE BITS ARE RESERVED BITS THAT ARE ENCODED AND THE LAST SIX BITS ARE PREPLACED BY AN INTERNALLY GENERATED TAIL.
5. N IS THE LENGTH OF THE FRAME IN MULTIPLES OF 20 MILLISECONDS (MS). N = 1 OR 2.

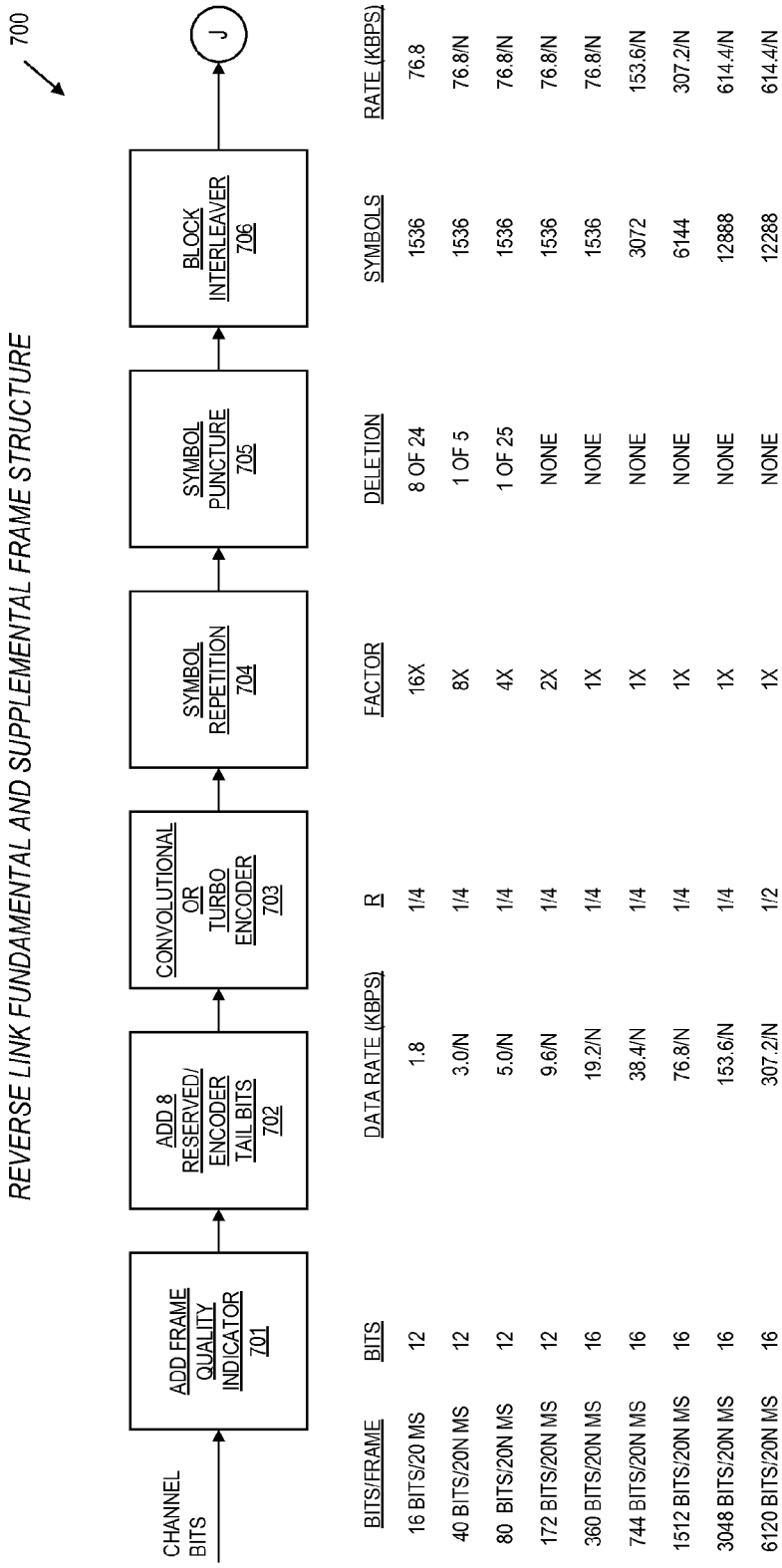

FIG. 7  REVERSE LINK FUNDAMENTAL AND SUPPLEMENTAL FRAME STRUCTURE

NOTES:
1. THE REVERSE FUNDAMENTAL CHANNEL ONLY USES 36 TO 192 ENCODER INPUTS PER FRAME.
2. TURBO CODING IS USED FOR THE REVERSE SUPPLEMENTAL CHANNELS WITH DATA RATE GREATER THAN 9.6 KBPS.
3. WITH CONVOLUTIONAL ENCODING, THE RESERVED/ENCODER TAIL BITS PROVIDE AN ENCODER TAIL. WITH TURBO CODING, THE FIRST TWO OF THESE BITS ARE RESERVED BITS THAT ARE ENCODED AND THE LAST SIX BITS ARE PREPLACED BY AN INTERNALLY GENERATED TAIL.
4. N IS THE LENGTH OF THE FRAME IN MULTIPLES OF 20 MILLISECONDS (MS). N = 1 OR 2.

ENHANCED WIRELESS COMMUNICATION WITH HARQ

CROSS-REFERENCE TO RELATED APPLICATIONS

This application claims the benefit of the following U.S. Provisional Applications, each of which is herein incorporated by reference for all intents and purposes.

| Ser. No. | FILING DATE | TITLE |
| --- | --- | --- |
| 61/327,831 (VTU.10-0016-US) | 26 Apr. 2010 | ENHANCED WIRELESS COMMUNICATION WITH HARQ |
| 61/332,989 (VTU.10-0019-US) | 10 May 2010 | ENHANCED WIRELESS COMMUNICATION WITH HARQ |

BACKGROUND OF THE INVENTION

1. Field of the Invention

This invention relates in general to the field of cellular communications, and more particularly to an apparatus and method for employing hybrid automatic repeat requests to enhance communications.

2. Description of the Related Art

The cell phone industry is undergoing exponential growth, not only in this country, but all over the world. In fact, it is well known that the over twenty percent of the adult population in the United States does not even have a traditional landline telephone. In addition to those who do not own a conventional telephone, nearly ninety percent of the adult population owns a wireless phone (i.e. cell phone).

In addition to the growth in ownership, the usage of cell phones is increasing as well over the use of traditional landline telephone coverage. In fact, one in seven adults now uses only cell phones. Whereas in the past cell phones were used when a landline was not available or under emergency conditions, lower carrier rates, affordability of family packages, and free mobile-to-mobile or friend-to-friend promotions have fostered in significant increases in usage. It is not uncommon today to walk into any public forum or facility and notice a majority of the people there talking on their cell phones.

The ability to communicate using a mobile phone, or mobile station, has been available since the middle of the last century. However, during the 1990's so-called "2G" or second generation mobile phone systems were provided that began the growth in both deployment and usage that we currently enjoy today. These initial systems predominately provided for the routing and reliable servicing of voice calls between parties. And, as one skilled in the art will appreciate, there are a number of timing and latency requirements associated with transmission and reception of voice data in order to maintain quality of service.

During the early 2000's so-called "3G" or third generation cellular systems were fielded that have provided significant increases in user capacity, quality of service, and data rate. CDMA2000, also known as 1xRTT, is perhaps the most prevalent of these 3G systems and this protocol is well known by those in the art to provide for excellent transmission of voice and data. Yet, the demands on these systems to significantly increase coverage and user capacity is unprecedented, particularly when it is also required to maintain the same quality of service. Accordingly, those in the field of art continue to make improvements to extant mechanisms and techniques in order to achieve these goals.

One such technique that is currently fielded enables cellular providers to increase the frame error rates of links between cellular towers (i.e., base stations) and the cell phones (i.e., mobile stations) that they currently service for fundamental channels in order to increase the coverage of supplemental channels and they rely on existing error recovery mechanisms such as automatic repeat request (ARQ) prescribed in the 1xRTT protocol to maintain quality of service, but these mechanisms are known to be relatively slow and inefficient for higher frame error rates.

Accordingly, what is needed is an apparatus and method for improving cellular communications in the presence of higher frame error rates.

Additionally, what is needed is a mechanism that allows for enhanced cellular communications at higher frame error rates that is advantageous to the performance of these cellular systems over that which has heretofore been provided.

Furthermore, what is needed is a technique that provides for early termination of frame transmissions in the presence of error feedback from a receiver and which automatically schedules for retransmission of frames that have not been positively acknowledged by the receiver.

SUMMARY OF THE INVENTION

The present invention, among other applications, is directed to solving the above-noted problems and addresses other problems, disadvantages, and limitations of the prior art, and furthermore provides a superior technique for enhancing communications throughput in the presence of increased frame error rates. In one embodiment, a wireless communication system is provided. The wireless communication system includes a receiver and a transmitter. The receiver is configured to receive a frame of data, and is configured to send an acknowledgement. The acknowledgement includes a positive acknowledgement (ACK) if the data is successfully decoded or a negative acknowledgement (NAK) if the data is unsuccessfully decoded. The acknowledgement is sent according to timing of an acknowledge mask. The transmitter is wirelessly coupled to the receiver, and is configured to receive the acknowledgement according to the acknowledge mask, and is configured to send a response to the receiver according to the acknowledgement. The response includes, if an ACK is received before transmission completes of the frame, the transmitter terminates transmission of the frame; if a NAK is received before transmission completes of the frame, the transmitter continues to send the frame; and if an ACK is not received before a predefined frame early scheduling point, the transmitter retransmits the frame after transmission completes of the frame.

One aspect of the present invention contemplates a wireless communication system. The wireless communication system includes a 1xRTT receiver and a 1xRTT transmitter. The 1xRTT receiver is configured to receive a frame of data, and is configured to send an acknowledgement. The acknowledgement includes a positive acknowledgement (ACK) if the data is successfully decoded or a negative acknowledgement (NAK) if the data is unsuccessfully decoded. The acknowledgement is sent according to timing of an acknowledge mask. The 1xRTT transmitter is wirelessly coupled to the 1xRTT receiver, and is configured to receive the acknowledgement according to the acknowledge mask, and is configured to send a response to the 1xRTT receiver according to the acknowledgement. The response includes, if an ACK is received before transmission completes of the frame, the 1xRTT transmitter terminates transmission of the frame; if a NAK is received before transmission completes of the frame, the 1xRTT transmitter continues to send the frame; and if an ACK is not received before a predefined frame early scheduling point, the 1xRTT transmitter retransmits the frame after transmission completes of the frame.

Another aspect of the present invention comprehends a method for wirelessly communicating. The method includes: within a receiver, first receiving a frame of data, and first sending an acknowledgement, the acknowledgement comprising: a positive acknowledgement (ACK) if the data is successfully decoded, or; a negative acknowledgement (NAK) if the data is unsuccessfully decoded; where the acknowledgement is sent according to timing of an acknowledge mask; and within a transmitter, wirelessly coupled to the receiver, second receiving the acknowledgement according to the acknowledge mask, and second sending a response to the receiver according to the acknowledgement, the response comprising: if an ACK is received before transmission completes of the frame, first terminating transmission of the frame; if a NAK is received before transmission completes of the frame, first continuing to send the frame; and if an ACK is not received before a predefined frame early scheduling point, first retransmitting the frame after transmission completes of the frame.

BRIEF DESCRIPTION OF THE DRAWINGS

These and other objects, features, and advantages of the present invention will become better understood with regard to the following description, and accompanying drawings where:

FIG. 5 is a timing diagram illustrating a 40 millisecond early frame termination sequence according to the present invention;

FIG. 6 is a block diagram detailing forward link fundamental and supplemental frame structures according to the present invention;

FIG. 7 is a block diagram illustrating reverse link fundamental and supplemental frame structures according to the present invention;

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

In view of the above background discussion on cellular communications and associated techniques employed within present systems for the correction of frame errors, a discussion of the present invention will now be presented with reference to FIGS. 1-9.

Figure 1:
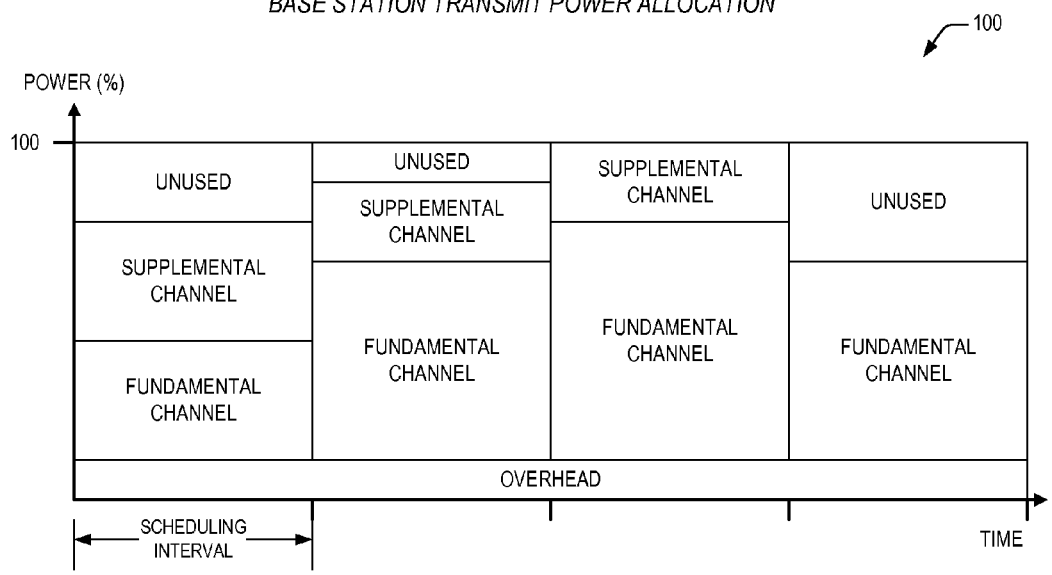
FIG. 1 is a timing diagram illustrating present day power allocation over time in a cellular base station.

Referring to FIG. 1, a timing diagram 100 is presented illustrating present day power allocation over time in a cellular base station. For purposes of the present application, the base station is considered to be of the type employed in a code division multiple access (CDMA) based wireless communications system such as the well known 1xRTT, also referred to as CDMA2000. As one skilled in the art will appreciate, a forward fundamental channel as shown in the diagram 100 is employed to send voice traffic and data fro the base station to mobile stations. A supplemental channel is also employed to send high speed data from the base station to the mobile stations. As one skilled will also appreciate, present day base stations dynamically allocate transmit power between these two channels in order to optimize coverage of a given area as a function of quality of service, one expression of which is frame error rate (FER).

As shown in the diagram 100, base station transmit power is typically reallocated as a function of a scheduling interval parameter. Conventionally, most 1xRTT cellular providers set the FER for their forward supplemental channels within their network to approximately five percent in order to provide an acceptable quality of service. However, the present inventors have noted that it is not uncommon for some providers to set the FER anywhere from 10 to 20 percent in order to achieve larger coverage. In doing so, these providers thus rely on automatic repeat request (ARQ) features within their radio link protocol (RLP) to recover from frame errors at the media access control (MAC) and physical (PHY) protocol layers. But as one skilled will appreciate, a high RLP retransmission rate resulting from present day ARQ features places a processing burden on the mobile stations, which typically exhibit high latency low throughput as a result of the increased burden. This is because selective ARQ in present day protocols is known to be relatively slow and comparatively inefficient when the packet error rate is not low enough.

As Table 1 illustrates, a typical forward supplemental channel (F-SCH) exhibits approximately 30 to 95 percent of its corresponding forward fundamental channel (FCH) coverage, depending on the rate of the F-SCH in use. These coverage factors are expressed for both 1xRTT radio channel 3 (RC3) and 1xRTT radio channel 4 (RC4) using modeling typical present day 1xRTT parameters including 20 millisecond (ms) frames, a 400 Hertz (Hz) power control (PC) rate, target FER of one percent for 9.6 Kilobit per second (kb/s) rate, target FER of two percent for 19.2 kb/s and 38.4 kb/s rates, and a target FER of five percent for 76.8 kb/s, 153.6 kb/s, and 307.2 kb/s rates.

TABLE 1

| Coverage Factors | | |
|---|---|---|
| | Coverage Area Relative to FCH | Channel Capacity within Coverage |
| Rate (RC3) | | |
| 19.2 kb/s | 98% | 8.0 |
| 38.4 kb/s | 92% | 4.4 |
| 76.8 kb/s | 85% | 2.7 |
| 153.6 kb/s | 66% | 1.6 |

TABLE 1-continued

| | Coverage Factors | |
|---|---|---|
| | Coverage Area Relative to FCH | Channel Capacity within Coverage |
| Rate (RC4) | | |
| 19.2 kb/s | 95% | 6.0 |
| 38.4 kb/s | 88% | 3.5 |
| 76.8 kb/s | 83% | 2.4 |
| 153.6 kb/s | 63% | 1.4 |
| 307.2 kb/s | 32% | 1.0 |

In fact, the present inventors have experimentally observed that relaxing the FER from five to 40 percent exhibits less than one decibel (dB) of actual gain (Eb/Nt) in a conventional CDMA2000 mobile station, where Eb is the energy per bit of the traffic channel and Nt is the total noise that is in the received bandwidth, a concept similar to the common analog signal-to-noise (S/N) ratio.

The present inventors have also noted that cellular providers, also referred to as "operators," set the FER for their supplemental channels (SCH) anywhere from five to 20 percent in order to achieve a larger SCH coverage, thus provided for a higher SCH user capacity. Yet, it is will known that a higher FER results in fewer frame early terminations as well as fewer initial frame acknowledgements (ACK). The higher FER allows more frames which is a more favorable transmission condition, thus reducing the need to do early termination. However, these allowed frames can not meet the RLP and the frame errors cannot be recovered by at the MAC and/or physical layers. Thus a higher FER will result in more RLP retransmissions, and as a consequence, the high mobile station latencies alluded to above.

Those skilled in the art will appreciate that frame retransmission without soft combining has previously been suggested to help reduce the noted latency and to increase mobile station throughput in the presence of a higher FER. But the lack of soft combining in a mobile station may greatly limit achievable gains, both in terms of latency and throughput, for it is costly to implement soft combining in a present day 1xRTT receiver, particularly to cover scenarios in which a frame and its corresponding retransmission are far apart in time. In fact, according to present data protocol, there is no mechanism for a receiver to known if and when a retransmission will be sent by the base station and consequently a very large memory would be required to cache all frames sent in the interim.

In addition to the above, when the FER is set between 10 and 20 percent, frame retransmission rate becomes excessively high because the FER of the initial frame and its retransmission(s) are almost identical if power control is effective.

To summarize then, the present inventors have observed that redundancy and latency increase with higher FER, since without soft combining, all previous transmissions essentially appear to be redundant and there is also decreased frame early termination gain experienced.

It is noted, though, that the differences in coverage (e.g., coverage gap) between a fundamental channel and a supplemental channel is an issue related to coverage, and operators want to shrink the coverage gap, in which SCH coverage can be anywhere from 30 to 95 percent of FCH coverage, as Table 1 depicts.

Accordingly, operators have at least two options. One option is to decrease FCH coverage by decreasing FCH power and allocating more power into an SCH. But this option is not preferable, particularly under conditions where transmit power in a base station is limited.

A second option is to employ ARQ while relaxing target FER of a SCH. This is a layer 2 (L2) solution in nature which will work to effectively reduce the latencies that would otherwise be exhibited. As noted above, there a claims to coverage improvements that come from a relaxed FER, but such relaxation results in higher RLP retransmissions and latency.

Accordingly, the present inventors have provided MAC-level (L2 level) ARQ mechanism to overcome the above noted disadvantages and limitation. As one skilled in the art will concur, the problems of insufficient SCH coverage latency are associated with the physical layer in a cellular system.

One aspect of the present invention is to employ L2 error control mechanisms that include employment of selective repeat ARQ when FER is increased from roughly 10 to 20 percent. Thus, when the FER is increased to extend coverage, selective repeat ARQ (also referred to as a hybrid ARQ (HARQ)) is employed to reduce the high latency that is a consequence of the increased FER. One embodiment contemplates a type I HARQ where, under a high initial FER, a base station assumes that a mobile station is indeed capable of performing soft combining when a retransmission is not far away in time.

Another embodiment comprehends a type II HARQ with an extended transmission span. At a high level, the type II HARQ is substantially similar to the present day 1xRTT 20 ms frame early termination rules but with the added benefit of an extended transmission span. Advantageously, this type II HARQ technique is proposed to achieve the same channel capacities under imprecise power control conditions as would otherwise be achieved under perfect power control condition. In contrast to a perfect and fast power control which demands a significant amount of processing overhead, the technique according to the present invention requires substantially less power control overhead (as low as 100 Hz) and generates less co-channel interference In one regard, the present invention comprehends extending a present day 20 ms frame early termination into a 40 ms frame early termination for cases when operators want to set a high FER, which will contribute to achievement the same FER targets and frame retransmission, yet with more achievable gains. As one skilled in the art will appreciate, frame early termination is a key feature introduced in the current 1xRTT specifications (i.e., revision E). But this feature applies to 20 ms frames. Yet, it is intended to reduce average transmit (TX) power and interference, thereby increasing user capacity and extending coverage. A 40 ms frame early termination according to the present invention functions to achieve the same goals as introducing soft combining into the current 20 ms frame retransmission because frame early termination contributes to the reduction of redundancy more than the reduction of retransmissions.

The present invention comprehends at least two mechanisms that are designed to operate in different FER regions and which are complementary to each other. In one embodiment, frame retransmission is provided for cases where the frequency of frame early termination is not sufficient.

MAC layer ARQ was introduced concurrent with the development of high rate packet data (HRPD) specifications. MAC layer ARQ reduces the time associated with the recovery of a lost packet by one round trip time (RTT). Further, the recovery is not dependent upon RLP not acknowledge (NAK) signaling. The techniques contemplated by the present invention enable delayed frame early termination on the SCH of the CDMA2000 1xRTT system when radio channel 8 (RC8) and radio channels 11/12 (RC11/12) are used. In one embodiment, the present invention contemplates delayed frame early termination acknowledge (ACK Masks). These masks enable a configured receiver to acknowledge a transmission in a 15th power control group (PCG) in a subsequent frame. Another embodiment comprehends signaling and enables a mobile station to indicate its capability to use MAC layer ARQ and for a base station to enable MAC layer ARQ for both F-SCH and R-SCH.

Advantageously, with the employment of MAC layer ARQ according to the present invention, performance at the link and transport layers can be improved as well. Specifically, the packet error rate within the point-to-point protocol may be reduced and the mean and variance in RTT of transport control protocol (TCP) segments can be reduced. In addition, for similar PPP and TCP performance, operators may set higher target FER values and achieve capacity gains and increased coverage.

Figure 2:
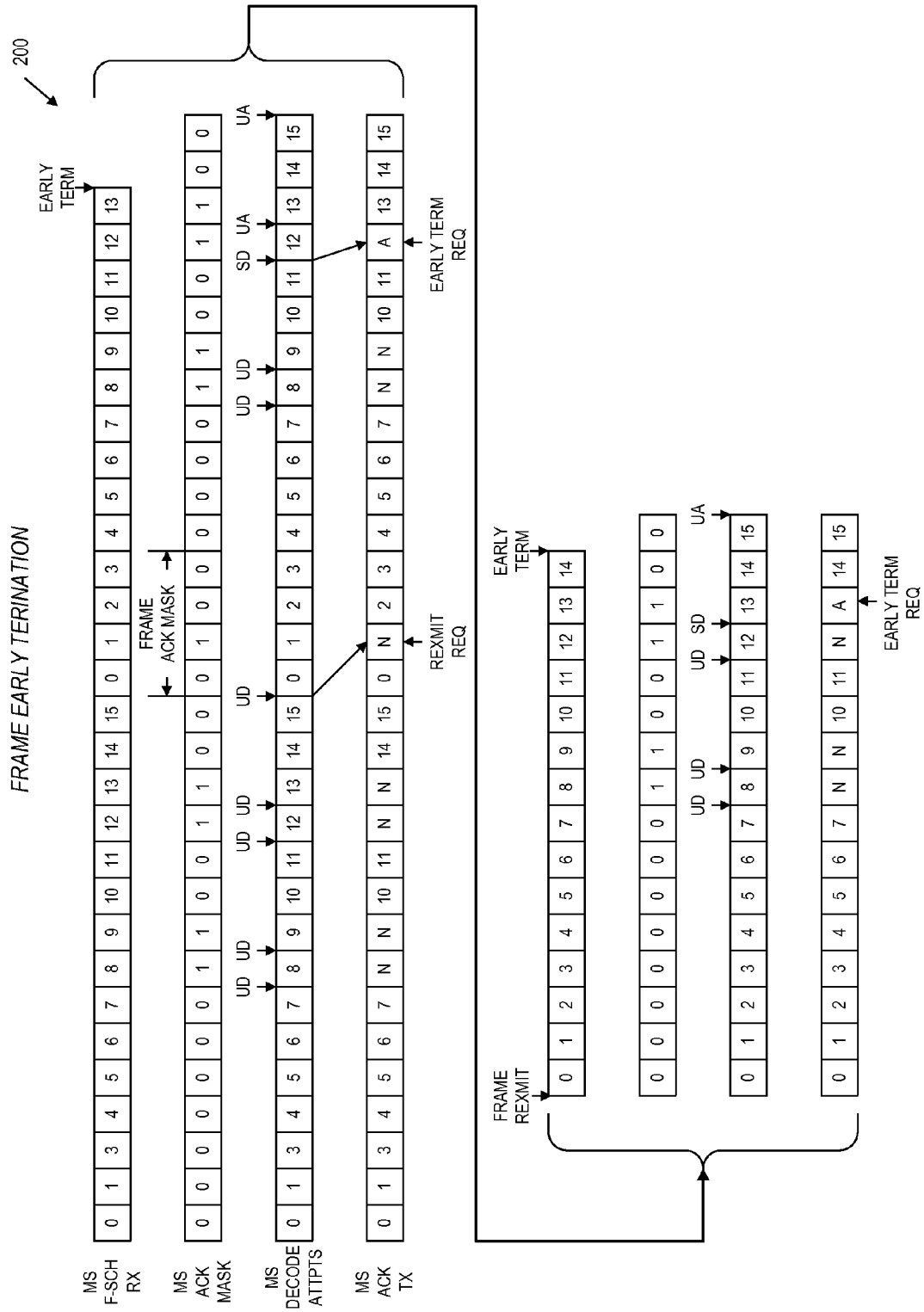
FIG. 2 is a timing diagram depicting a frame early termination sequence as viewed from the perspective of a mobile station.

FIG. 2 is a timing diagram 200 depicting a frame early termination sequence as viewed from the perspective of a mobile station. The diagram 200 shows the events that occur during three slots of a 1xRTT transmission as seen from the perspective of a mobile station. As one skilled will appreciate, each slot comprises 15 power control groups, where a single power control group (PCG) is 1.25 ms in duration. Thus, a single slot transmission is 20 ms in duration. Four event lines are depicted, receipt of F-SCH PCGs by a mobile station (MS F-SCH RX), application of an MS ACK mask, decode attempts by the MS (MS DECODE ATTPS), and transmission of ACKs by the MS (MS ACK TX). Note that unsuccessful decode attempts (UD) are experienced at PCGs 7, 8, 11, and 12 of a first slot. Also note that the ACK mask is set to 1 during immediately following PCGs and a NAK is also transmitted over MS ACK TX. In the 15$^{th}$ PCG, another unsuccessful decode attempt (UD) is experienced, resulting in a frame ACK mask of 0100 during PCGs 0-3 of the second slot. This causes NAK with a retransmit frame request (REXMIT REQ) to be transmitted in PCG 1 of the second slot.

In addition, during the second slot, unsuccessful decode attempts are made in PCGs 7 and 8 (with commensurate ACK masks and NAKs transmitted), but during PGC 11 a successful decode (SD) is achieved, thus setting the ACK mask in the following PCG, which results in an ACK (A) with early termination request. Unused attempts (UA) follow in PCGs 12 and 15 since the early termination request was previously sent. The base station responds by terminating the frame transmission at PCG 13.

A third frame is sent, which is a retransmission of the first frame. Note that UDs occur at PCGs 7, 8, and 11, and an SD happens at PCG 12, thus causing an early termination ACK at PCG 13. Consequently, the base station terminates at PCG 14 and the MS has a UA at PCG 15.

In contrast to the case illustrated in FIG. 2, the present invention provides for a 20 ms frame early retransmission where a new frame or a repeat frame is scheduled for the next frame as opposed to skipping a frame, depending on the target initial FER. This mechanism can be employed when the network is operated either low FER or high FER regimes.

According to this embodiment, a frame retransmission occurs only when there is no positive ACK received before a last PCG of a current frame and a target initial FER is very high. In one embodiment, a very high FER is greater than 50 percent.

According to this embodiment, a new frame is transmitted in a next frame when there is a positive ACK received before the last PCG of the current frame or when the target initial FER is not very high (e.g., less than 50 percent).

Furthermore according to this embodiment, during the next frame transmission, if a NAK of the last PCG of the previous frame is received, a transmission switch will happen so that the new frame transmission will be stopped and the PCGs of the previous frame will be retransmitted. This may happen during the first three or four PCGs of the next frame transmission.

The present invention also provides for a 40 ms frame early termination embodiment where a network is still operated in a low FER region. In one embodiment, a low FER region is roughly between one and five percent FER. According to this embodiment, each 20 ms SCH frame is stretched into one radio channel 4 (RC4) 40 ms SCH frame, which is known to have up to 33 percent more coverage or 50 percent less TX power for the same coverage. Accordingly, redundancy is PCG-level due to frame early termination and for mobiles stations having favorable channel conditions, frames will be terminated very early. In fact, according to this embodiment, up to 50 percent of all frame transmissions can be terminated early.

Figure 3:
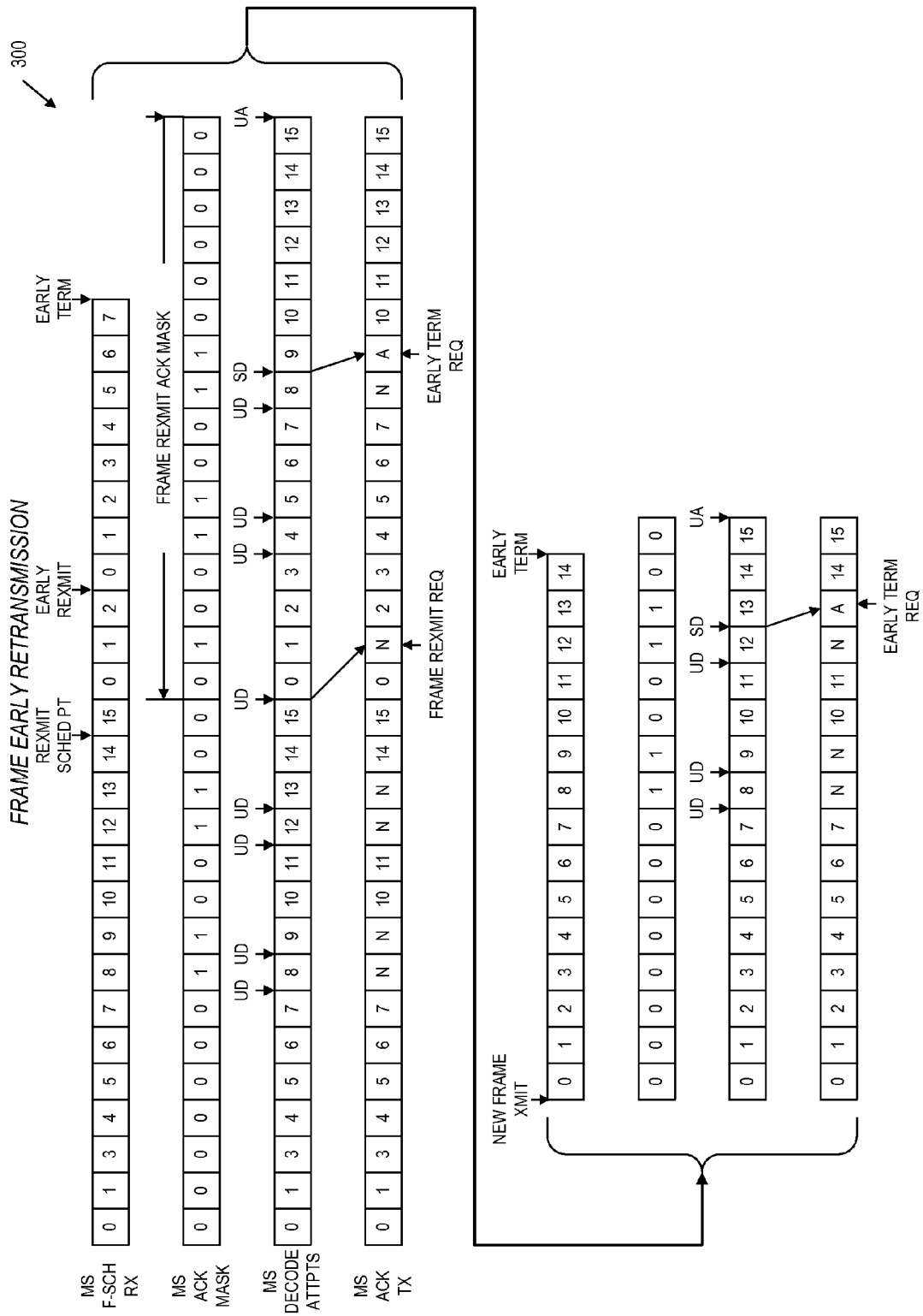
FIG. 3 is a timing diagram featuring a frame early retransmission sequence as viewed from the perspective of a mobile station.

FIG. 3 is a timing diagram 300 featuring a frame early retransmission sequence according to the present invention as viewed from the perspective of a mobile station. Note that according to the early frame retransmission embodiment, an early retransmission of a NAKed first frame occurs after PCG 2 of a second frame and that because of SD in PCG 8, the retransmitted frame early terminates at PCG 7. Consequently a new frame transmission occurs at PCG 0 of frame 3, which terminates at PCG 14 due to an SD at PCG 12.

Figure 4:
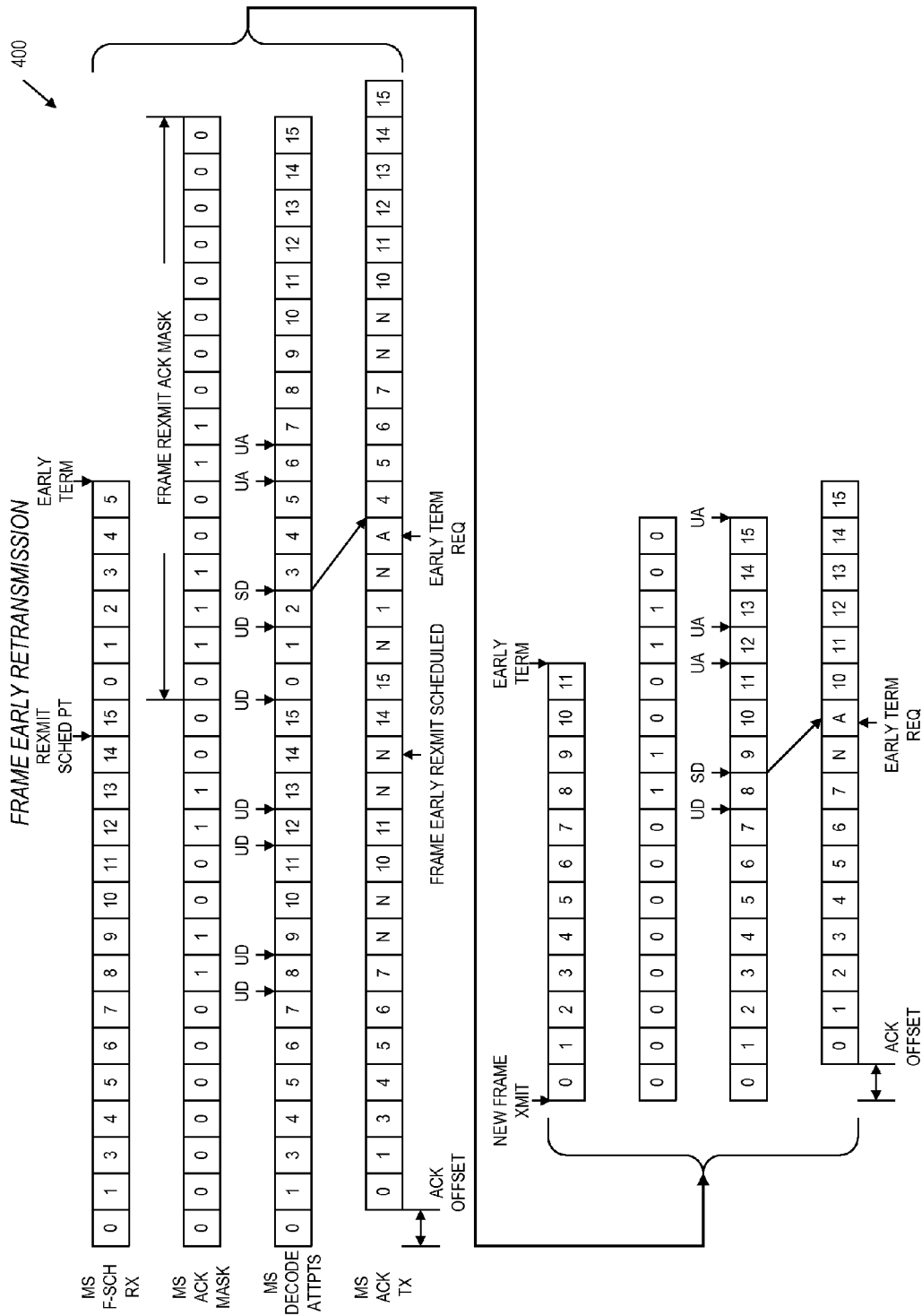
FIG. 4 is a timing diagram showing an alternative a frame early retransmission sequence as viewed from the perspective of a mobile station.

FIG. 4 is a timing diagram 400 showing an alternative a frame early retransmission sequence as viewed from the perspective of a mobile station. Note that because a positive ACK is not received during the first frame, it is scheduled for retransmission at PCG 14 and retransmission begins immediately in a second frame. Because a positive ACK with early termination request is sent at PCG 2 of the second frame, transmission of the retransmission is terminated at PCG 5 of the second frame. A new frame is transmitted following termination during the second frame. This new frame is successfully decoded at PCG 8 and the positive ACK sent during the same PCG due to a 20 ms ACK offset according to the present invention. Thus, the new frame is early terminated at PCG 11.

In one embodiment a transmitter, which can be a mobile station or a base station, sends multiple frames. Each frame is sent in the unit of a PCG as in shown in the diagrams 300, 400 where one PCG is 1.25 ms in duration, and where a typical frame is 20 ms in duration, about 16 PCGs. When a receiver is receiving each frame from the transmitter, it will attempt to decode it before it receives the whole frame. From the receiver perspective, if the receiver is able to successfully decode a frame before the end of the frame, it will send ah acknowledge, ACK, as shown in the diagrams 300, 400, in a predefined acknowledge channel. The ACK transmission timing is indicated by the ACK mask, which is shared by both the transmitter and receiver. If the receiver is NOT able to successfully decode a frame before the PCG indicated by the ACK mask, it will send a NAK in the predefined acknowledge channel. The NAK and ACK transmission timings usually are the same and indicated by the ACK mask, which is shared by both the transmitter and receiver.

From the transmitter perspective, while the transmitter is sending PCGs for each frame, it also monitors a predefined acknowledge channel for each receiver to which it is coupled. Typically, the transmitter monitors the acknowledge channel to determine if there is an ACK or NAK received in the PCGs indicated by a predefined and shared ACK mask. If an ACK is received before the end of the current frame, it will terminate the transmission of the current frame. If a NAK is received before the end of the current frame, it will continue to send the rest PCGs if and until it receives an ACK. If no ACK is received before a predefined frame early scheduling point, the current frame will be transmitted in the next frame.

Regarding retransmissions, while the transmitter is sending the PCGs of each retransmitted frame, it also monitors another predefined acknowledge channel for each receiver because typically a different ACK mask is employed for frame retransmission. Thus, the transmitter monitors the channel for the presence of ACKs and NAKs received in the PCGs indicated by the predefined retransmission ACK mask. If an ACK is received before the end of the retransmission, the transmitter will terminate the transmission of the current retransmission. If a NAK is received before the end of the current retransmission, it will continue to send the rest PCGs if and until it receives an ACK. If no ACK is received before a predefined frame early scheduling point, the current retransmitted frame will be retransmitted again in the next frame. A frame early scheduling point is defined to be one or two PCGs prior to the last PCG. Before the frame early scheduling point, if a frame early termination ACK is received, a new frame will be sent as the next frame. An early termination ACK according to the present invention indicates that a current frame is successfully received. If no frame early termination ACK is received, either the current frame will be retransmitted or a new frame will be sent as the next frame. After the frame early scheduling point and during the first 3 or 4 PCGs of the next frame, if the last PCG of the previous frame is ACK'd and if the current frame is a new frame, then transmission of the new frame is continued. If the current frame is a retransmission, it will be early terminated. If the last PCG of the previous frame is NAK'd and if the current frame is a new frame, it will be terminated and the previous frame will be retransmitted. If the current frame is a retransmission, then transmission of the current frame will continue.

FIG. 5 is a timing diagram 500 illustrating a 40 millisecond early frame termination sequence according to the present invention. The embodiment shown in the diagram 500 provides for the addition of a 40 ms RC4 SCH frame structure into RC11 and a 40 ms RC3 SCH frame structure into RC8, thus extending the current 1xRTT revision E frame early termination to 40 ms SCH frames. Extension of early termination to 40 ms allows a frame early termination ACK mask to be delayed by a predefined number of PCGs so that the last PCG of each SCH frame can be ACK'd or NAK'd by the receiver. The 40 ms frame early termination embodiment also provides for repeating the transmission of a frame for which an acknowledgement was not received by either a base station or a mobile station. Retransmission may occur on or after frame N+2, if frame N was unacknowledged. One advantage of this embodiment is to maintain or increase the probability of frame early termination under situations when SCH TX power is lowered, thus providing for increased time diversity and early termination with slow power control.

As shown in the diagram, an SD occurs at a $19^{th}$ PCG, thus causing an ACK with early termination request to be transmitted in the same, but offset PCG on the predefined ACK channel. Thus, transmission of the frame is terminated in PCG 21 and a new frame is transmitted during the following frame slot.

The present inventors note that the 20 ms frame retransmission embodiment discussed with reference to FIGS. 2 and 3 is an example of type I HARQ without soft combining and is well known to suffer from the redundancy in the final retransmission, especially when each retransmission size is large and/or no soft combining is available. Thus, the frame retransmission embodiment discussed, which comprises ACK, NAK, and frame retransmission, is very similar to present day ARQ.

The key issues of a 20 ms frame retransmission scheme are that there is no soft combing between each NAK'd frame and its retransmission(s) and because of the 20 ms frame size, redundancy in the last retransmission can be high.

The frame early termination can be taken as an example of type II HARQ where the current frame early termination, in which a whole frame is coded, checksummed, and sent in the sequence of multiple PCGs, is substantially a PCG-level type II HARQ with incremental redundancy. The inherent soft combining capability and incremental redundancy of type II HARQ contributes to a reduction in average TX power and co-channel interference.

Regarding current experience using RLP ARQ, many current operators deploy two RLP retransmissions in each round to ensure low packet error rate for upper layers, even though the physical layer FER is set to be approximately 5 percent. Without soft combining, it is expect the proposed 20 ms frame retransmission will require more than two frame retransmissions when FER is set to be more than 5 percent. On the other hand, existing studies show, with soft combining, typically one retransmission is good enough, even when FER is set to be as high as 30 percent.

Regarding the 40 ms RC4 SCH frame embodiment discussed with reference to FIG. 5, it is noted that this embodiment is provides to improve throughput under conditions where the base station has a TX power limitation. When FER is set to be 5 percent and no frame early termination is available, the 40 ms SCH frame is known to have the problems of additional latency and slow power control. In the situations where FER is set to be about 15 percent or more and FPC/RPC rates are slowed down to 400 Hz, 200 Hz and more with frame early termination, the 40 ms RC4 SCH frame formats become very attractive in helping operators increase sector throughput, increase user capacity, increase coverage, and reduce latency without increasing total TX power.

Regarding providing for ACK of the last PCG in a frame, it is noted that according to present day current frame early termination protocols, both base stations and mobile stations attempt to decode the frame before receiving it completely. For example, if the mobile successfully decodes the frame, it transmits an ACK to the base station. Upon reception of the ACK, the BS stops transmitting the rest of the frame. But the capability to ACK or NAK the last PCG of a frame is not supported, that is, PCG 15 of a 20 ms frame or PCG 31 of a 40 ms frame. Thus, a present day frame early termination ACK can only be transmitted to ACK the PCGs in the current frame and hence latency is increased.

But a delayed ACK as is discussed with reference to FIGS. 4 and 5 can be employed to delay the SCH ACK mask so that it allows the receiver to send an ACK or NAK during PCG 0-4 of the next frame to ACK or NAK the last two PCGs of the current frame. According to the present invention, then, the last PCG ACK or NAK will be transmitted only if no previous ACK was sent. Consequently, the last PCG ACK essentially becomes a frame ACK.

FIG. 6 is a block diagram 600 detailing forward link fundamental and supplemental frame structures according to the present invention. The structures include an add frame quality indicator element 601 that receives channel bits and that is coupled to an add 8 reserved/encoder tail bits element 602. The add 8 reserved/encoder tail bits element 602 is coupled to a convolutional or turbo encoder element 603, which is coupled to a symbol repetition element 604. The symbol repetition element 604 is coupled to a symbol puncture element 605, which is coupled to a block interleaver element 606. The block interleaver element 606 provides modulation symbols (W) as its output. According to the present invention, the manner in which bits/frame for nine different rates are translated into modulation symbols at a corresponding nine different rates is as shown in the diagram 600. It is noted that the diagram 600 address both 20 ms and 40 ms frame lengths.

FIG. 7 is a block diagram 700 illustrating reverse link fundamental and supplemental frame structures according to the present invention. The structures include an add frame quality indicator element 701 that receives channel bits and that is coupled to an add 8 reserved/encoder tail bits element 702. The add 8 reserved/encoder tail bits element 702 is coupled to a convolutional or turbo encoder element 703, which is coupled to a symbol repetition element 704. The symbol repetition element 704 is coupled to a symbol puncture element 705, which is coupled to a block interleaver element 706. The block interleaver element 706 provides modulation symbols (J) as its output. According to the present invention, the manner in which bits/frame for nine different rates are translated into modulation symbols at a corresponding nine different rates is as shown in the diagram 700. It is noted that the diagram 700 address both 20 ms and 40 ms frame lengths.

Figure 8:
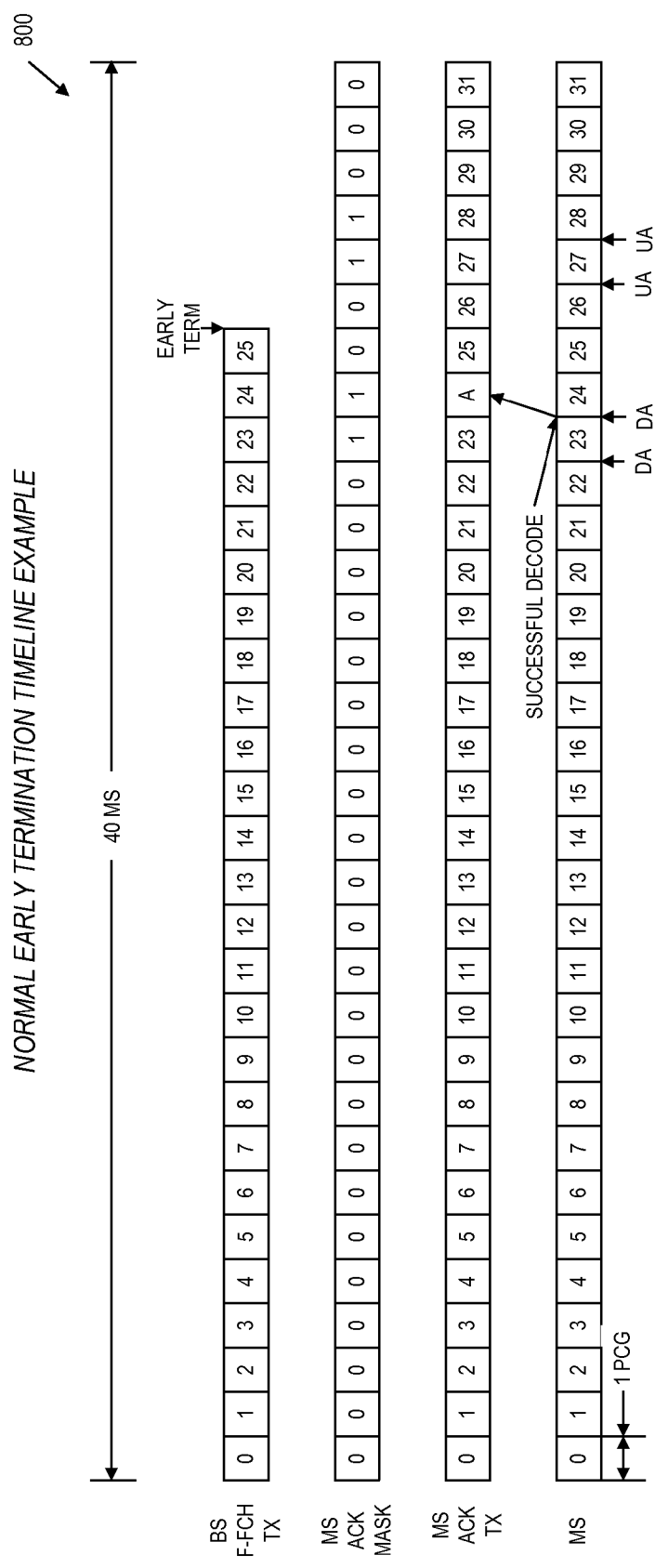
FIG. 8 is a timing diagram depicting a normal early termination sequence according to the present invention.

FIG. 8 is a timing diagram 800 depicting a normal early termination sequence according to the present invention. A base station forward fundamental channel transmission (BS F-FCH TX) is depicted along with mobile station acknowledge mask (MS ACK MASK) and MS ACK transmissions (MS ACK TX). The bottom line is a scale of PCGs as seen by the mobile station. Note that a successful decode of the frame occurs at PCG 23, thus causing an ACK to be sent in the following PCG. Thus, the base station terminates transmission of the current frame at PCG 25.

Figure 9:
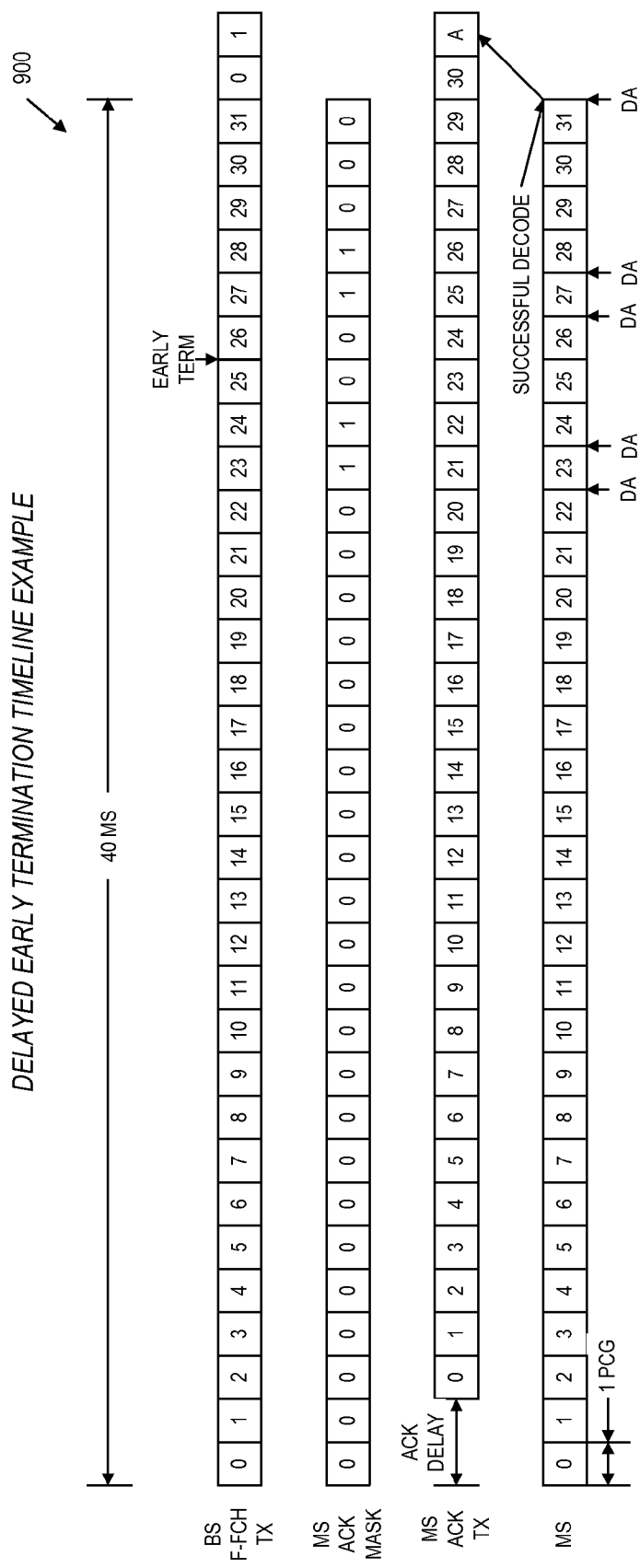
FIG. 9 is a timing diagram featuring a delayed early termination sequence according to the present invention.

FIG. 9 is a timing diagram 900 featuring a delayed early termination sequence according to the present invention. Like the timing diagram 800 of FIG. 8, the timing diagram 900 depicts a BS F-FCH TX along with MS ACK MASK and MS ACK TX. The bottom line is a scale of PCGs as seen by the mobile station. According to the embodiment shown in the diagram 900, however, ACKs are delayed for transmission to the base station by two PCGs. Hence, the last PGC (PCG 31) is successfully decoded and can be ACK'd because of the two PCG delay.

In order to provide the above noted embodiments within existing 1xRTT Revision E constraints, the protocol must include the following provisions.

Delayed ACK Capability support indications must be provided. Thus, the following fields must be added to Capability Record:

F_SCH_DELAYED_ACK_SUPPORTED
R_SCH_DELAYED_ACK_SUPPORTED

Addition of these fields allow a mobile station to indicate support for delayed ACK according to the present invention on F-SCH and R-SCH.

According to the present 1xRTT protocol, due to forward link and reverse link timing alignment, it is not possible to acknowledge the 15th PCG in a frame. To enable delayed ACK according to the present invention, the following 2 bit attributes are provided to allow for delaying the acknowledgement sent by the receiver:

FOR_SCH_DELAYED_ACK (2 bits)
00=Delay 1 PCG
01=Delay 2 PCGs
10=Delay 3 PCGs
11=Delay 4 PCGs REV_SCH_DELAYED_ACK (2 bits)
00=Delay 1 PCG
01=Delay 2 PCGs
10=Delay 3 PCGs
11=Delay 4 PCGs According to the embodiments disclosed herein, it is noted that there is no physical layer or MAC layer impact on present day designs. The existing 1xRTT ACK channel is employed. Accordingly, an ACK for the transmission on 15th PCG of frame N will be sent in frame N+1 when the FOR_SCH_DELAYED_ACK or REV_SCH_DELAYED_ACK is enabled.

This present day information record identifies whether the following optional or MOB_P_REV dependent features are supported by the mobile station.

| Type-Specific Field | Length (bits) |
|---|---|
| ACCESS_ENTRY_HO | 1 |
| ACCESS_PROBE_HO | 1 |
| ANALOG_SEARCH | 1 |
| [ . . . ] | |
| F_SCH_EARLY_TERM_SUPPORTED | 1 |
| POWER_CONTROL_MODE_01_SUPPORTED | 1 |
| F_SCH_DELAYED_ACK_SUPPORTED | 1 |
| R_SCH_DELAYED_ACK_SUPPORTED | 1 |
| RESERVED | 0-7 (as needed) |

POWER_CONTROL_MODE_01_SUPPORTED—Power Control Mode 01 supported indicator: The mobile station shall set this field to '1' if the mobile station supports power control mode '01' for RC11 and RC12; otherwise, the mobile station shall set this field to '0'.

F_SCH_DELAYED_ACK_SUPPORTED—Forward SCH Delayed frame early termination Support indicator: The mobile station shall set this field to '1' if the mobile station supports the use of delayed frame early termination for RC11 or RC12.

R_SCH_DELAYED_ACK_SUPPORTED—Reverse SCH Delayed frame early termination Support indicator: The mobile station shall set this field to '1' if the mobile station supports the use of delayed frame early termination for RC 8.

RESERVED—Reserved bits: The mobile station shall add reserved bits as needed in order to make the length of the entire information record equal to an integer number of octets. The mobile station shall set these bits to '0'.

GE_REC_TYPE—Type of General Extension Record: The base station shall set this field based on the type of record as specified in Table 2.

TABLE 2

General Extension Record Type values

| GE_REC_TYPE (binary) | Description |
|---|---|
| 00000000 | Reverse Channel Information. |
| 00000001 | Radio Configuration Parameters Record |
| 00000010 | Delayed Frame Early Termination Record. |
| 00000010-11111111 | Reserved |

GE_REC—General Extension Record: The base station shall set this field according to the previous occurrence of the GE_REC_TYPE in this message.

If the GE_REC_TYPE is set to '00000010' then the base station shall set the GE_REC to the following:

| | |
|---|---|
| FOR_SCH_DELAYED_ACK_INCL | 1 |
| FOR_SCH_DELAYED_ACK | 2 |
| REV_SCH_DELAYED_ACK_INCL | 1 |
| REV_SCH_DELAYED_ACK | 2 |
| RESERVED | 0-7 (as needed) |

FOR_SCH_DELAYED_ACK_INCL—Delayed frame early termination for the Forward Supplemental Channel Inclusion indicator:

FOR_SCH_DELAYED_ACK—Delayed frame early termination value for the Forward Supplemental Channel: The base station shall omit this field if FOR_SCH_DELAYED_ACK_INCL is set to '0'. Otherwise the base station shall include this field and set it as follows:

This field consists of the subfields shown in Table 3. The base station shall set the subfields corresponding to the PCGs of frame N+1 where delayed ACK for frame N is set to '1', and shall set the remaining subfields to '0'.

TABLE 3

FOR_SCH_DELAYED_ACK value For F-SCH

| Value | Description |
|---|---|
| 00 | Delay frame early termination by 1 PCG |
| 01 | Delay frame early termination by 2 PCGs |
| 10 | Delay frame early termination by 3 PCGs |
| 11 | Delay frame early termination by 4 PCGs |

REV_SCH_DELAYED_ACK_INCL—Delayed frame early termination for the Reverse Supplemental Channel Inclusion indicator REV_SCH_DELAYED_ACK—Delayed frame early termination value for the Reverse Supplemental Channel: The base station shall omit this field if REV_SCH_DELAYED_ACK_INCL is set to '0'. Otherwise the base station shall include this field and set it as follows:

This field consists of the subfields shown in Table 4. The base station shall set the subfields corresponding to the PCGs of frame N+1 where delayed ACK for frame N is set to '1', and shall set the remaining subfields to '0'.

TABLE 4

REV_SCH_DELAYED_ACK for R-SCH

| Value | Description |
|---|---|
| 00 | Delay frame early termination by 1 PCG |
| 01 | Delay frame early termination by 2 PCGs |
| 10 | Delay frame early termination by 3 PCGs |
| 11 | Delay frame early termination by 4 PCGs |

RESERVED—Reserved bits: The mobile station shall add reserved bits as needed in order to make the length of the entire GE_REC record equal to an integer number of octets. The mobile station shall set these bits to '0'.

Initialization of RC parameters: The mobile station shall initialize the RC parameters as follows:

The mobile station shall set REV_SCH_ACK_MASKs to '0000 0000 0010 1010'.

The mobile station shall set FOR_SCH_DELAYED_ACKs to '00'

The mobile station shall set REV_SCH_DELAYED_ACKs to '00'

The mobile station shall set FOR_N2M_INDs to '001' (4 bad frames).

The mobile station shall set RPC_MODEs to '00' (200 to 400 bps).

Delayed ACK Record update procedures: The mobile station shall update Delayed ACK Record as follows:

If the mobile station receives a Delayed ACK record in a General Extension Message that contains FOR_SCH_DELAYED_ACK or REV_SCH_DELAYED_ACK values that the mobile station does not support, the mobile station shall send a Mobile Station Reject Order with ORDQ equal to 00011111.

If the mobile station receives a Delayed ACK record in a General Extension Message that contains FOR_SCH_DELAYED_ACK or REV_SCH_DELAYED_ACK values that the mobile station can support, the mobile station shall:

The mobile station shall set FOR_SCH_DELAYED_ACKs to FOR_SCH_DELAYED_ACK value received in the Delayed ACK record.

The mobile station shall set REV_SCH_DELAYED_ACKs to REV_SCH_DELAYED_ACK value received in the Delayed ACK record.

The base station and mobile station may use the FOR_SCH_DELAYED_ACK or REV_SCH_DELAYED_ACK to transmit an ACK or NAK for frame n during the reception of frame n+1.

The mobile station should use the FOR_SCH_DELAYED_ACK to transmit an acknowledgement only when the F-SCH is assigned to the mobile station.

Those skilled in the art should appreciate that they can readily use the disclosed conception and specific embodiments as a basis for designing or modifying other structures for carrying out the same purposes of the present invention, and that various changes, substitutions and alterations can be made herein without departing from the scope of the invention as defined by the appended claims.

What is claimed is:

1. A wireless communication system, comprising:
a receiver, configured to receive a frame of data, wherein said frame of data comprises a plurality of power control groups, and wherein said receiver is configured to send an acknowledgement, said acknowledgement comprising:
a positive acknowledgement (ACK) if said data is successfully decoded, or;
a negative acknowledgement (NAK) if said data is unsuccessfully decoded;
wherein said acknowledgement is sent according to timing of an acknowledge mask, and wherein said acknowledge mask is configured to indicate whether said plurality of power control groups (PCGs) is decoded successfully upon reception and wherein said acknowledgement is delayed by a predefined number of power control groups to complete said acknowledgement of a last power control group relative to transmission of said frame; and
a transmitter, wirelessly coupled to said receiver, configured to receive said acknowledgement according to said acknowledge mask, and configured to send a response to said receiver according to said acknowledgement, said response comprising:
if an ACK is received before transmission completes of said frame, said transmitter terminates transmission of said frame;
if a NAK is received before transmission completes of said frame, said transmitter continues to send said frame; and if an ACK is not received before a predefined frame early scheduling point, said transmitter retransmits said frame after transmission completes of said frame.

2. The wireless communication system as recited in claim 1, wherein said receiver and said transmitter comport with the 1xRTT wireless protocol.

3. The wireless communication system as recited in claim 1, wherein said receiver comprises a mobile station and said transmitter comprises a base station.

4. The wireless communication system as recited in claim 1, wherein said frame is 20 milliseconds in duration and wherein said frame comprises 16 power control groups (PCGs).

5. The wireless communication system as recited in claim 1, wherein said frame early scheduling point is predefined to be two PCGs prior to a last PCG in said frame.

6. The wireless communication system as recited in claim 1, wherein said response further comprises:
    if an ACK is received for said last PCG during a first part of transmission of a next frame:
    if said next frame comprises a new frame, said transmitter continues to send said new frame; and
    if said next frame comprises said frame, said transmitter terminates transmission of said frame; and
    if a NAK is received for said last PCG during a first part of transmission of a next frame:
    if said next frame comprises a new frame, said transmitter terminates transmission of said next frame and retransmits said frame; and
    if said next frame comprises said frame, said transmitter continues transmission of said frame.

7. The wireless communication system as recited in claim 1, wherein said frame is 40 milliseconds in duration and wherein said frame comprises 32 power control groups.

8. A method for wirelessly communicating, comprising:
    within a receiver, first receiving a frame of data comprising a plurality of power control groups, and first sending an acknowledgement, the acknowledgement comprising:
        a positive acknowledgement (ACK) if the data is successfully decoded, or;
        a negative acknowledgement (NAK) if the data is unsuccessfully decoded;
    wherein the acknowledgement is sent according to timing of an acknowledge mask, and wherein the acknowledge mask is configured to indicate whether the plurality of power control groups is decoded successfully upon reception;
    delaying the acknowledgement by a predefined number of power control groups to complete the acknowledgement of a last power control group relative to transmission of the frame; and
    within a transmitter, wirelessly coupled to the receiver, second receiving the acknowledgement according to the acknowledge mask, and second sending a response to the receiver according to the acknowledgement, the response comprising:
        if an ACK is received before transmission completes of the frame, first terminating transmission of the frame;
        if a NAK is received before transmission completes of the frame, first continuing to send the frame; and
        if an ACK is not received before a predefined frame early scheduling point, first retransmitting the frame after transmission completes of the frame.

9. The method as recited in claim 8, wherein the receiver and the transmitter comport with the 1xRTT wireless protocol.

10. The method as recited in claim 8, wherein the receiver comprises a mobile station and the transmitter comprises a base station.

11. The method as recited in claim 8, wherein the frame is 20 milliseconds in duration and wherein the frame comprises 16 power control groups (PCGs).

12. The method as recited in claim 8, wherein the frame early scheduling point is predefined to be two PCGs prior to a last PCG in the frame.

13. The method as recited in claim 8, wherein the response further comprises:
    if an ACK is received for the last PCG during a first part of transmission of a next frame:
    if the next frame comprises a new frame, second continuing to send the new frame; and
    if the next frame comprises the frame, second terminating transmission of the frame; and
    if a NAK is received for the last PCG during a first part of transmission of a next frame:
    if the next frame comprises a new frame, third terminating transmission of the next frame and third retransmitting the frame; and
    if the next frame comprises the frame, third continuing transmission of the frame.

14. The method as recited in claim 8, wherein the frame is 40 milliseconds in duration and wherein the frame comprises 32 power control groups.

* * * * *